(12) United States Patent  (10) Patent No.: US 7,607,728 B2
Hiruta et al.  (45) Date of Patent: Oct. 27, 2009

(54) PASSENGER CONSTRAINING APPARATUS

(75) Inventors: Teruhiko Hiruta, Minato-ku (JP);
Hiromichi Yoshikawa, Minato-ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/585,502

(22) Filed: Oct. 24, 2006

(65) Prior Publication Data
US 2007/0090633 A1  Apr. 26, 2007

(30) Foreign Application Priority Data
Oct. 25, 2005  (JP)  ............................ 2005-310158
Jan. 13, 2006  (JP)  ............................ 2006-006260

(51) Int. Cl.
*B60R 21/00* (2006.01)
*B60R 21/16* (2006.01)
(52) U.S. Cl. ................................. 297/216.1; 280/730.1
(58) Field of Classification Search .............. 297/216.1, 297/DIG. 3; 280/730.1, 728.2, 728.1
See application file for complete search history.

(56) References Cited

U.S. PATENT DOCUMENTS 5,568,936 A * 10/1996 Spilker et al. ............ 280/728.2
6,682,141 B2 * 1/2004 Reynolds et al. ......... 297/216.1
6,752,454 B2 * 6/2004 Ruel et al. ............... 297/216.1
2003/0222490 A1 * 12/2003 Sakai ...................... 297/216.1
2005/0067209 A1  3/2005 Yoshikawa et al.
2006/0017266 A1  1/2006 Yoshikawa et al.

FOREIGN PATENT DOCUMENTS

EP  1550588  7/2005
JP  10217818  8/1998
JP  2005231624  9/2005

OTHER PUBLICATIONS

European Search Report dated Jan. 2, 2008 relating to corresponding European Patent Application No. 06121471.4-2424.

* cited by examiner

*Primary Examiner*—Milton Nelson, Jr.
(74) *Attorney, Agent, or Firm*—Fitch, Even, Tabin & Flannery

(57) ABSTRACT

A passenger constraining apparatus is provided in which a bag is arranged under a seat cushion, to improve durability of the bag. In one form, a passenger constraining apparatus includes a bag being arranged above a seat pan and being inflatable so as to push a front portion of the seat cushion from the lower side, and an inflator (gas generator) for inflating the bag. A protecting member is assembled to a bottom surface of the seat cushion. The protecting member is of a sheet shape formed of rubber or synthetic resin.

5 Claims, 14 Drawing Sheets

PASSENGER CONSTRAINING APPARATUS

FIELD OF THE INVENTION

The present invention relates to a passenger constraining apparatus for constraining a passenger on a seat of a vehicle such as an automotive vehicle upon collision and, more specifically, to a passenger constraining apparatus configured to constrain a lumbar part of the passenger upon front collision and prevent a passenger's body from moving forward or downward.

BACKGROUND OF THE INVENTION

In a system for constraining a passenger in an automotive vehicle upon collision, Japanese Unexamined Patent Application Publication No. 10-217818 discloses a passenger constraining apparatus in which an inflatable bag is arranged between a seat cushion and a seat pan, so that a front portion of the seat cushion is pushed upward by inflating the bag upon collision of the vehicle to prevent a submarine phenomenon that the passenger tends to slip through a lower side of a lap belt upon front collision even though a seatbelt is fastened.

SUMMARY OF THE INVENTION

In the passenger constraining apparatus having a bag arranged under the seat cushion, it is an object of the present invention to improve durability of the bag as descried above.

A passenger constraining apparatus according to a first form of the invention is a passenger constraining apparatus including a bag being arranged between a seat cushion and a member under the seat cushion so as to extend in the direction of the lateral width of a seat and being capable of inflating so as to press a front portion of the seat cushion from the lower side, and a gas generator for inflating the bag in case of vehicle emergency, characterized in that a protecting member for protecting the bag is provided at least one of between the bag and the seat cushion and between the bag and the member under the seat cushion.

In a second form of the invention, the passenger constraining apparatus according to the first form is characterized in that the protecting member is assembled to a bottom surface of the seat cushion.

In a third form of the invention, the passenger constraining apparatus according to the first or second form is characterized in that the protecting member is a sheet shape formed of rubber of resin.

In a fourth form of the invention, the passenger constraining apparatus according to the first form is characterized in that the protecting member covers at least an upper side of the bag, and the protecting member is adapted to be opened by an inflating pressure of the bag to allow the bag to inflate.

In a fifth form of the invention, the passenger constraining apparatus according to the fourth form is characterized in that the bag is assembled to the protecting member, and the protecting member is mounted to the member under the seat cushion.

In a sixth form of the invention, the passenger constraining apparatus according to the fifth form is characterized in that the protecting member and the bag are secured to the member under the seat cushion by a common hooking member.

In a seventh form of the invention, the passenger constraining apparatus according to the first form is characterized in that the protecting member surrounds the bag, the protecting member is formed of an expandable material, and the protecting member is expanded by the inflating pressure of the bag to allow the bag to inflate.

In the present invention, the protecting member is provided between the bag and the seat cushion or the member under the seat cushion, and hence direct friction between the bag and these members are avoided, so that the durability of the bag is improved.

In the case in which the protecting member is assembled to the bottom surface of the seat cushion as in the second form of the invention, the installation of the protecting member is also achieved by mounting the seat cushion to the seat. Therefore, assembly of the seat is simplified.

As in the third form of the invention, the protecting member is preferably a sheet-shaped material formed of rubber or resin.

In the mode of the fourth form of the invention, since the protecting member covers at least the upper side of the bag when the bag is not inflated, the direct friction between the bag and the seat cushion is avoided, and hence good durability of the bag is achieved. When the bag is inflated, the protecting member is opened, and the seat cushion is pressed by the inflating bag.

By assembling the bag to the protecting member and the mounting the protecting member to the member under the seat cushion as in the fifth form of the invention, the mounting work of the protecting member and the bag to the member under the seat cushion can be simplified.

With the configuration in which the protecting member and the bag to the member are secured to the member under the seat cushion with a common hooking member as in the sixth form of the invention, the mounting work can further be facilitated, and the reduction of the cost of the members can also be achieved.

In the mode of the seventh form of the invention, the protecting member formed of the expandable material surrounds the bag, and hence the protecting member is expanded when the bag is inflated. Therefore, the configuration is simplified.

DETAILED DESCRIPTION OF THE PREFERRED EMBODIMENTS

Figure 1:
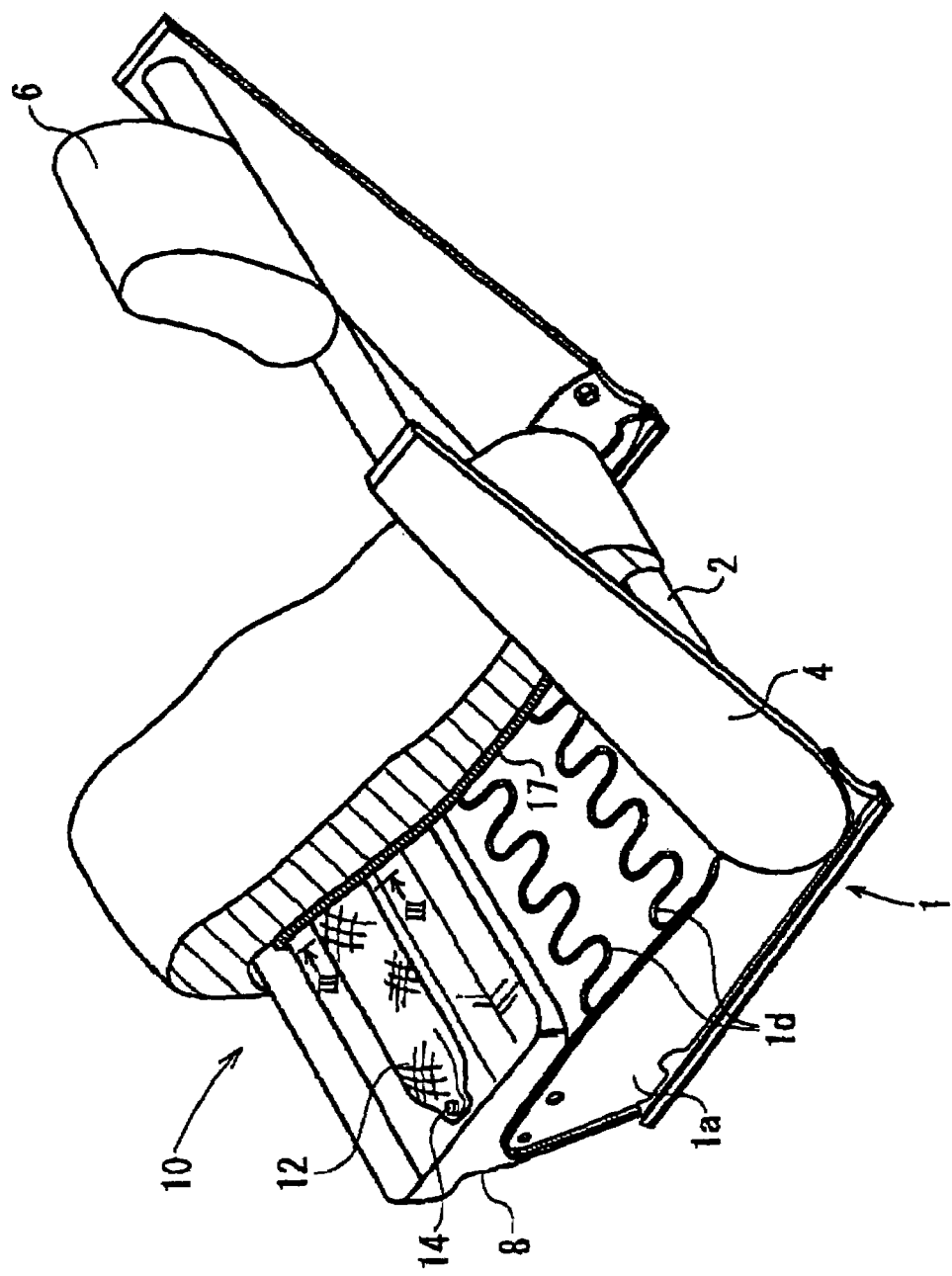
FIG. 1 is a perspective view of a frame of a seat provided with a passenger constraining apparatus according to an embodiment of the present invention when a bag is not inflated, and showing a seat cushion along a vertical cross section.
Figure 2:
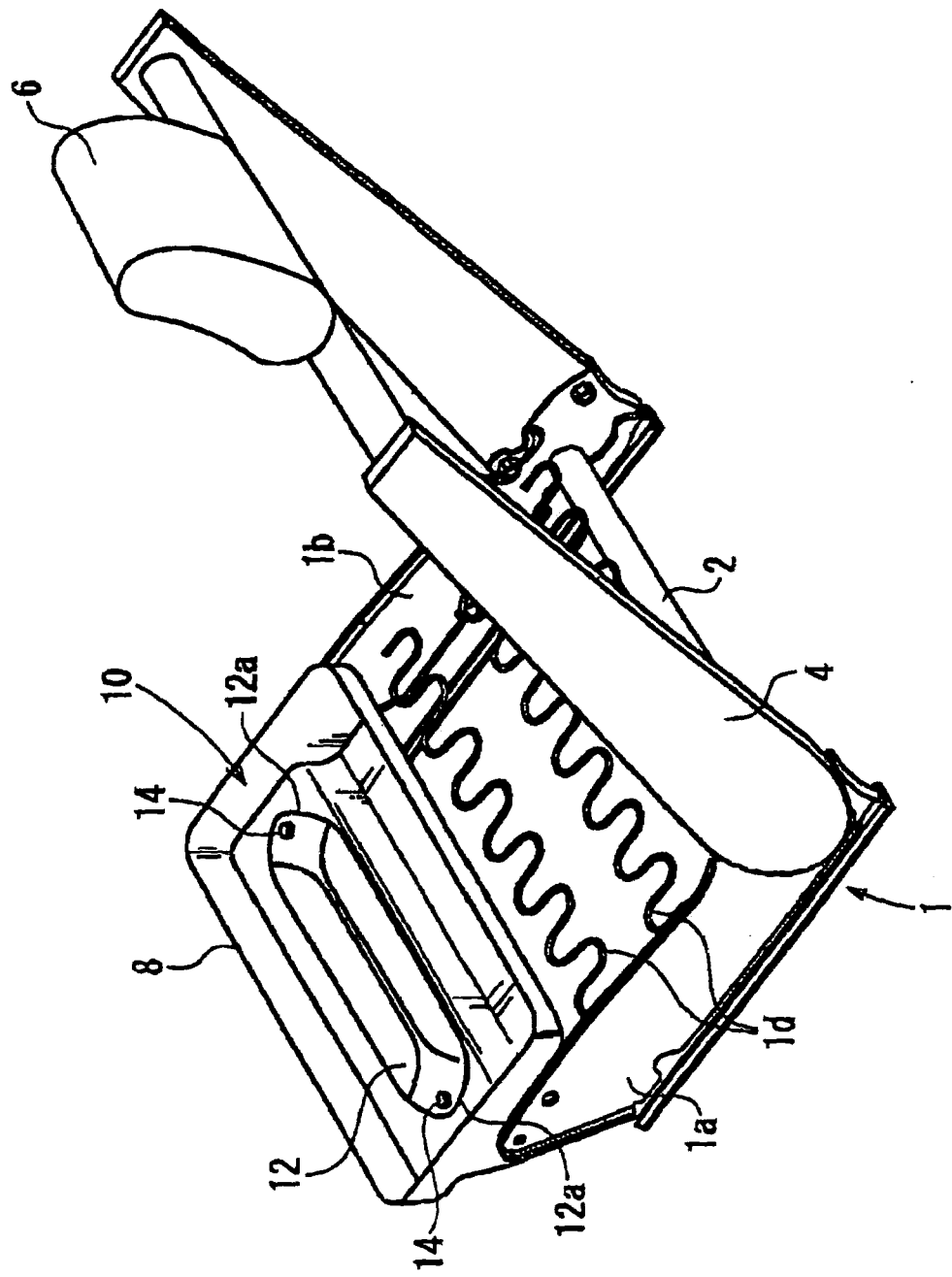
FIG. 2 is a perspective view of a state in which the seat cushion is removed from FIG. 1.
Figure 3:
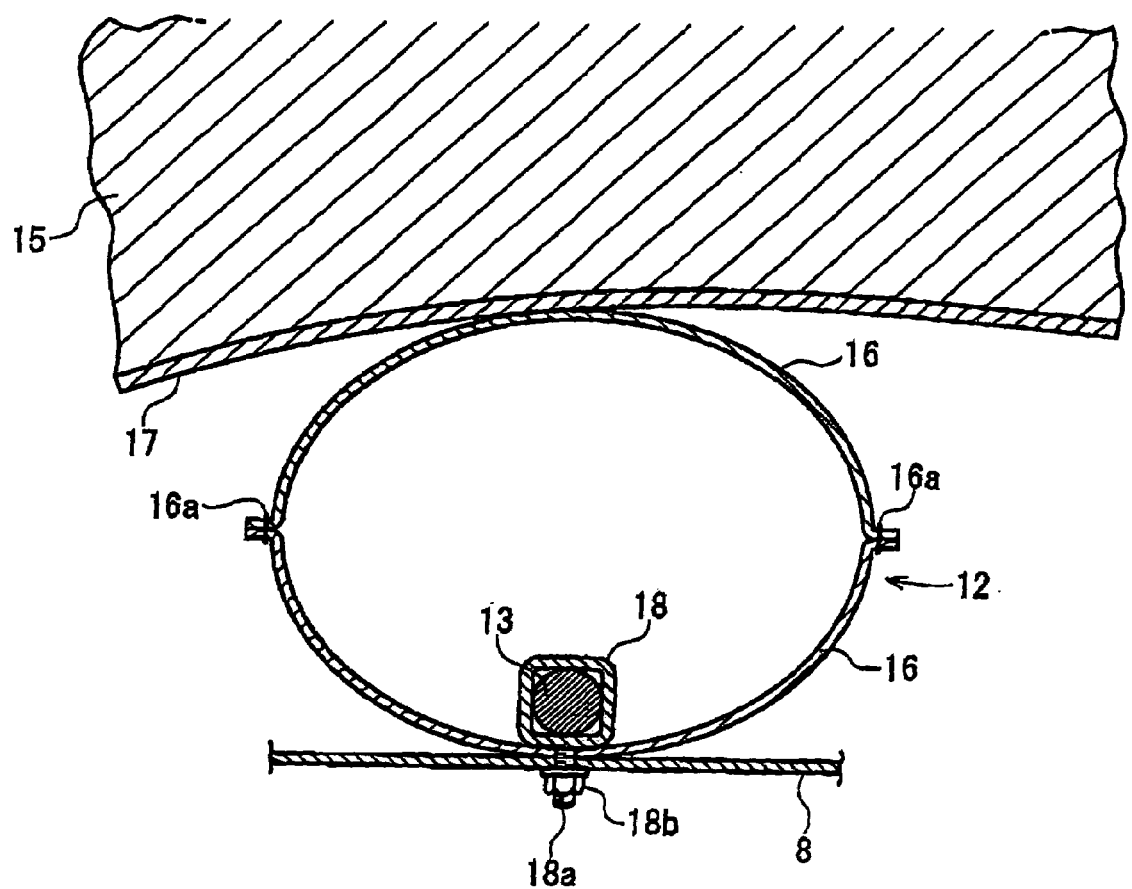
FIG. 3 is a cross-sectional view taken along the line III-III in FIG. 1 when the bag is inflated.
Figure 4:
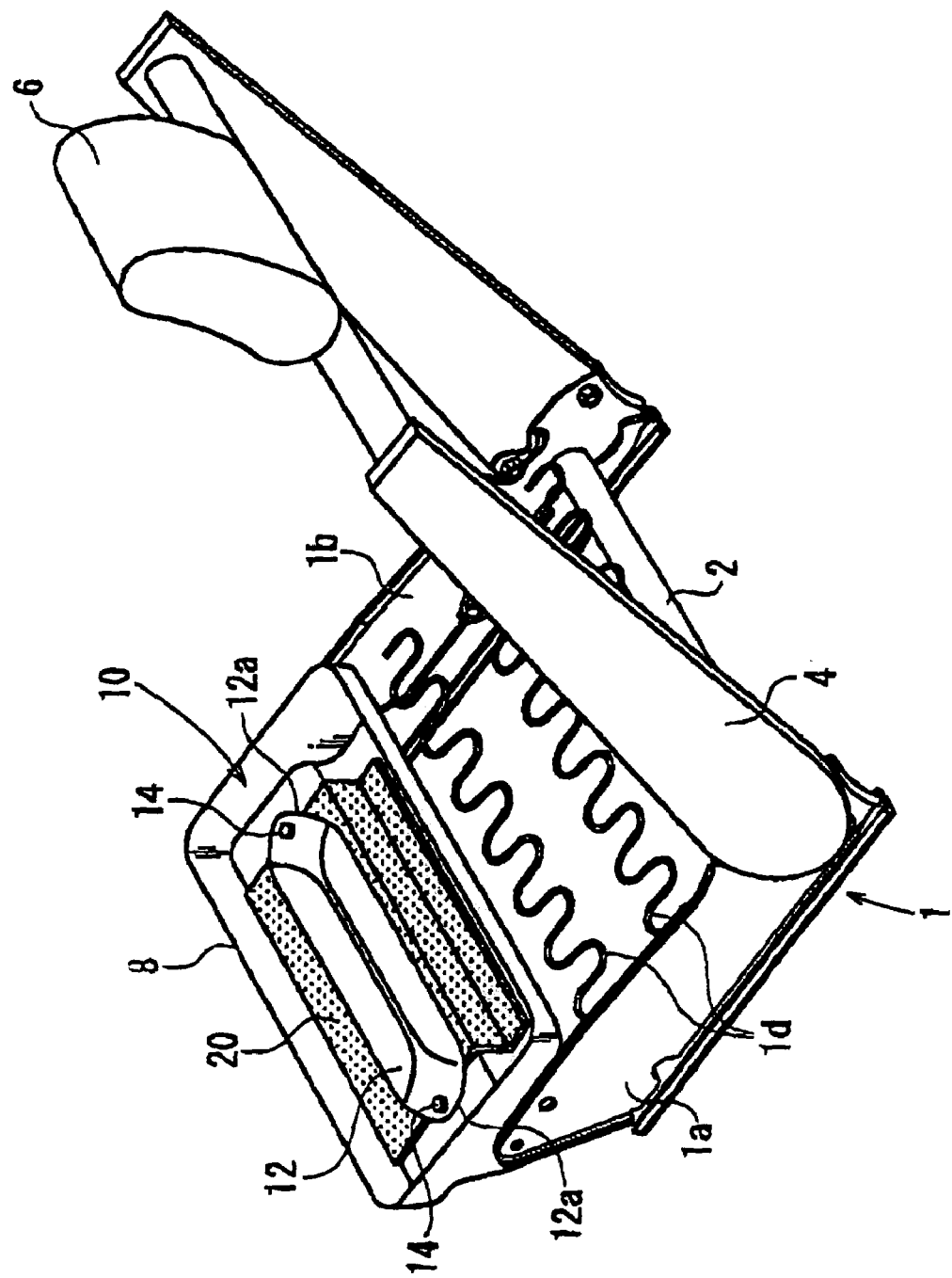
FIG. 4 is a perspective view showing another embodiment.

Referring now to the drawings, embodiments of the present invention will be described. FIG. 1 is a perspective view of a frame of a seat provided with a passenger constraining apparatus according to an embodiment of the present invention when a bag is not inflated, and showing a seat cushion along a vertical cross section. FIG. 2 is a perspective view of a state in which the seat cushion is removed from FIG. 1. FIG. 3 is a cross-sectional view taken along the line III-III in FIG. 1 when the bag is inflated. FIG. 4 is a perspective view showing another embodiment.

The frame constituting the seat of an automotive vehicle includes a base frame 1, and a back frame 4 connected to the base frame 1 rotatably via a spindle 2 and a reclining device (not shown). A head rest 6 is mounted to an upper portion of the back frame 4. The base frame 1 includes left and right side frames 1a, 1b, and a seat pan 8 is provided so as to extend between front portions of the side frames 1a, 1b.

A seat cushion 15 and a seatback (not shown) formed of urethane or the like are mounted to the base frame 1 and the back frame 4. The seat pan 8 is arranged under a front portion of the seat cushion 15. Reference numeral 1d in FIG. 1 shows a spring which rotatably supports the seat cushion 15.

A passenger constraining apparatus 10 includes a bag 12 which is arranged above the seat pan 8 and is inflatable so as to push the front portion of the seat cushion 15 from the lower side, and an inflator (gas generator) 13 for inflating the bag 12. The bag 12 extends laterally (in the direction of the width of the vehicle) of the seat pan 8. Both end sides of the bag 12 in terms of the lateral direction are secured to the seat pan 8 with bolts 14. The seat cushion 15 is installed on an upper side of the bag 12.

In this embodiment, the bag 12 is formed into a bag shape by overlapping a plurality of panels 16 and stitching peripheral edges thereof together as shown in FIG. 3. Reference numeral 16a designates a seam formed by a thread or the like which is used for stitching the panels 16 together.

In this embodiment, a protecting member 17 is assembled to a bottom surface of the seat cushion 15. The protecting member 17 has a sheet shape formed of rubber or synthetic resin, and is secured to the seat cushion 15 by a suitable securing mechanism such as bonding, adhering, flat fastener, stitching, hooking or the like. In this embodiment, the protecting member 17 is provided substantially entirely on the bottom surface of the seat cushion 15. However, it may be provided only in an inflatable area of the bag 12.

In this embodiment, the inflator 13 in a rod shape is arranged in the bag 12. The inflator 13 extends so that the longitudinal direction thereof is oriented in the direction of the width of the vehicle. The inflator 13 includes a gas injection port (not shown) on a side peripheral surface thereof so as to inject gas in the radial direction from the gas injection ports.

As shown in FIG. 3, a retainer 18 for securing the inflator 13 to the seat pan 8 is connected to the inflator 13. A stud bolt 18a is projected from the retainer 18. The stud bolt 18a is inserted into a bolt insertion hole on a lower surface of the bag 12 and a bolt insertion hole of the seat pan 8, and the inflator 13 and the bag 12 are fixed to the seat pan 8 by securing a nut 18b.

The bag 12 is folded so as to be flat along an upper surface of the seat pan 8 with the width in the fore-and-aft direction reduced in the normal state (when the passenger constraining apparatus is not activated). However, the bag 12 may be folded after having mounted to the seat pan 8, and may be mounted in the state of being folded in advance and mounted to the seat pan 8 in a state of being maintained in shape by a shape-holding member (not shown). The bag 12 may also be installed on the seat pan 8 in a state of being spread over the seat pan 8 without being folded.

An operation of the passenger constraining apparatus 10 is as follows.

When the front collision of the automotive vehicle is detected, the inflator 13 is activated to inject gas, and gas from the inflator 13 inflates the bag 12. Consequently, a front portion of the seat cushion is pushed upward or knocked up from below to increase the density, so that the forward movement of a lumbar part of a passenger is prevented or constrained.

In this passenger constraining apparatus 10, the protecting member 17 is provided on the bottom surface of the seat cushion 15, and hence a direct friction between the bag 12 and the seat cushion 15 does occur neither in the non-inflated state nor in the inflated state of the bag. Therefore, good durability and damage-resistant property of the bag 12 are achieved.

In the present invention, a protecting member 20 may be provided between the bag 12 and the seat pan 8. In this arrangement, the direct friction between the bag 12 and the seat pan 8 is prevented both in the non-inflated state and in the inflated state of the bag 12, and the durability and the damage-resistant property of the bag 12 is improved. Although not shown in FIG. 4, a seat cushion is installed on the upper side of the bag 12.

In the present invention, the protecting members 17, 20 may be provided on the upper side and a lower side of the bag 12 respectively.

In the above-described embodiment, the inflator 13 is provided inside the bag 12. However, it is also possible to provide the inflator outside the bag so that gas is introduced into the bag via a duct or the like.

Figure 5:
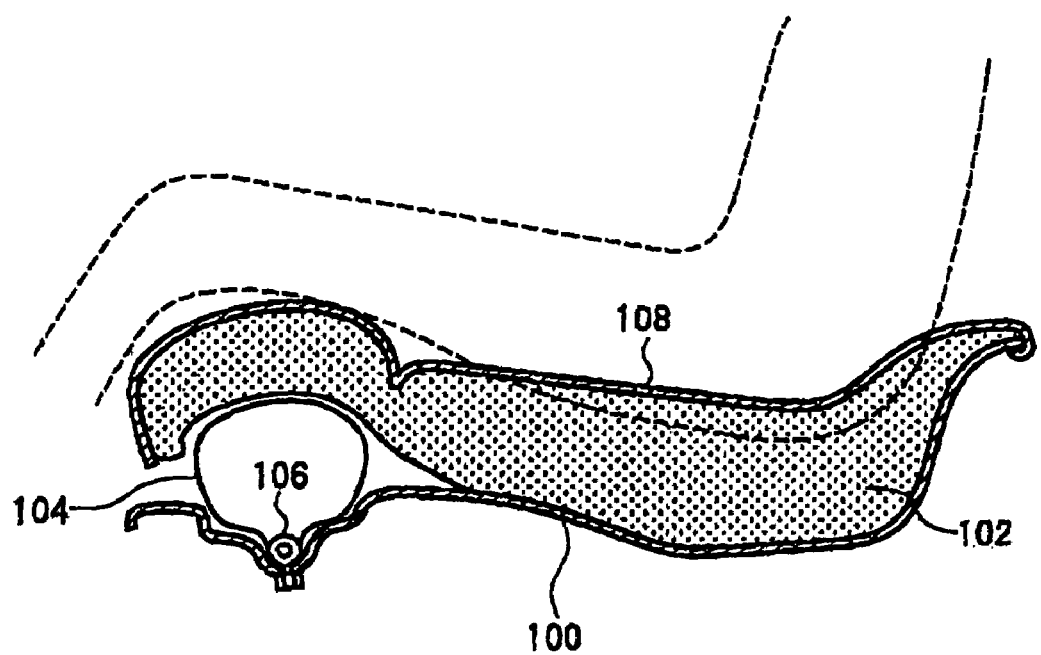
FIG. 5 is a vertical cross-sectional view taken in the fore-and-aft direction of a seat showing the passenger constraining apparatus in the related art.

FIG. 5 is a vertical cross-sectional view taken in the fore-and-aft direction of a seat showing the passenger constraining apparatus in the same publication. In a front portion of the seat, an airbag 104 is arranged between a cushion frame (seat pan) 100 and a seat pad 102. This airbag 104 extends in the direction of the lateral width of the seat, and is inflatable by an inflator 106. An upper surface of the seat pad 102 is covered by a trim cover 108, and the passenger sits thereon.

When the inflator 106 is activated upon collision, the airbag 104 is inflated, and a front portion of the seat pad 102 is pushed upward or knocked up from below to increase the density, so that the forward movement of the passenger's body is prevented (including "constrained").

Figure 6:
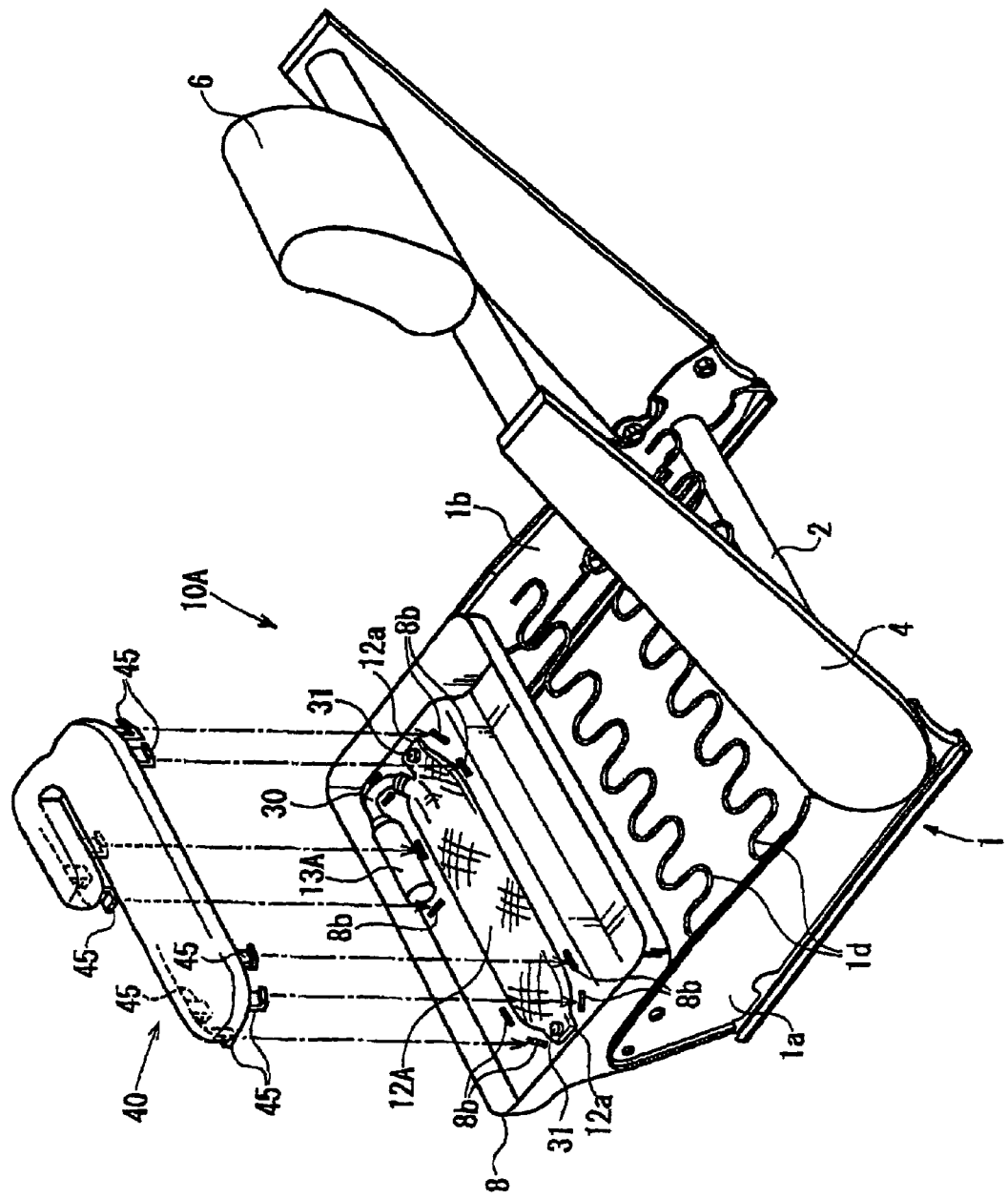
FIG. 6 is a perspective view of a frame of a seat provided with a passenger constraining apparatus according to still another embodiment before a protecting member is mounted.
Figure 7:
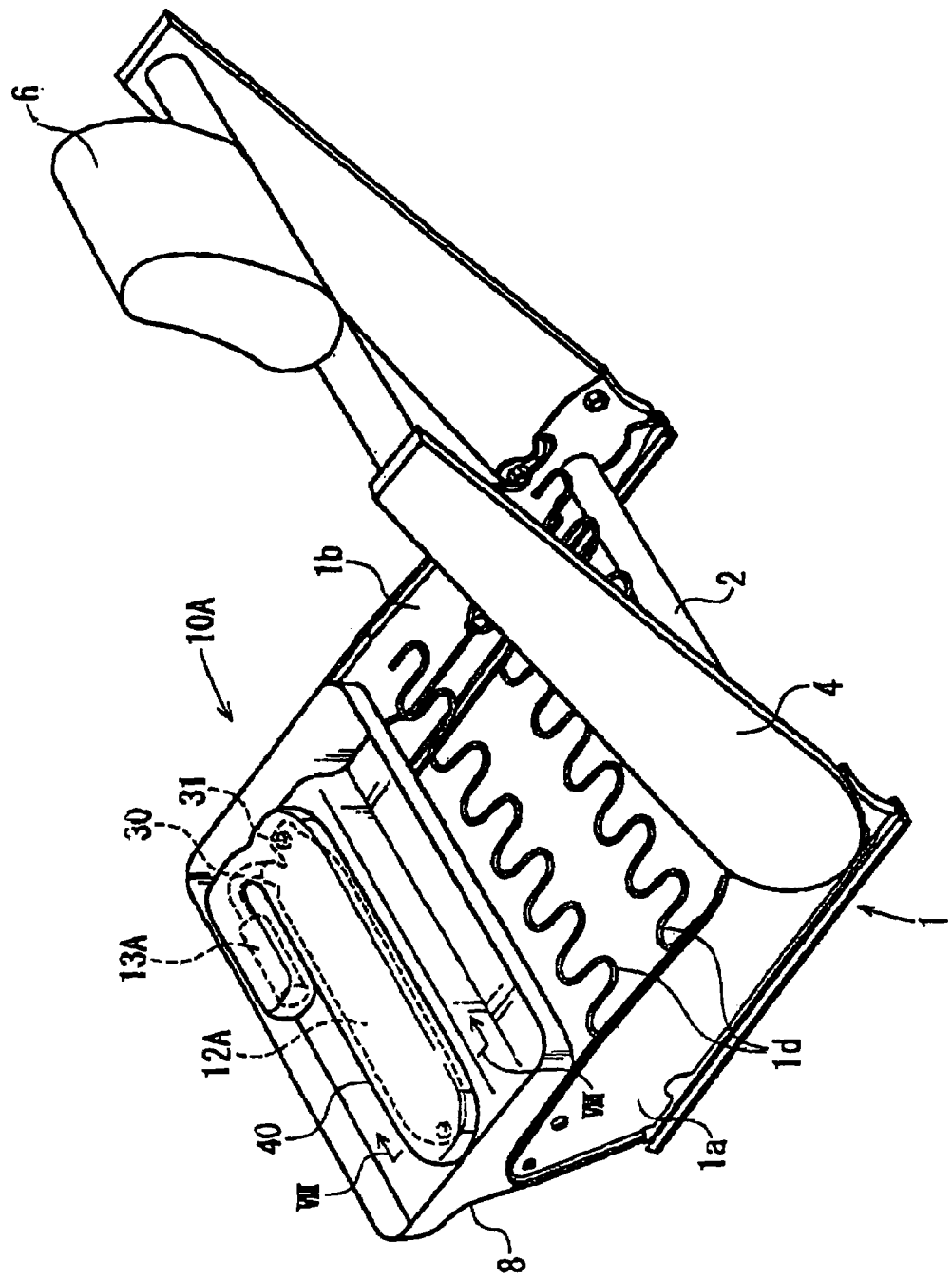
FIG. 7 is a perspective view of the passenger constraining apparatus in FIG. 6 after the protecting member is mounted.
Figure 8:
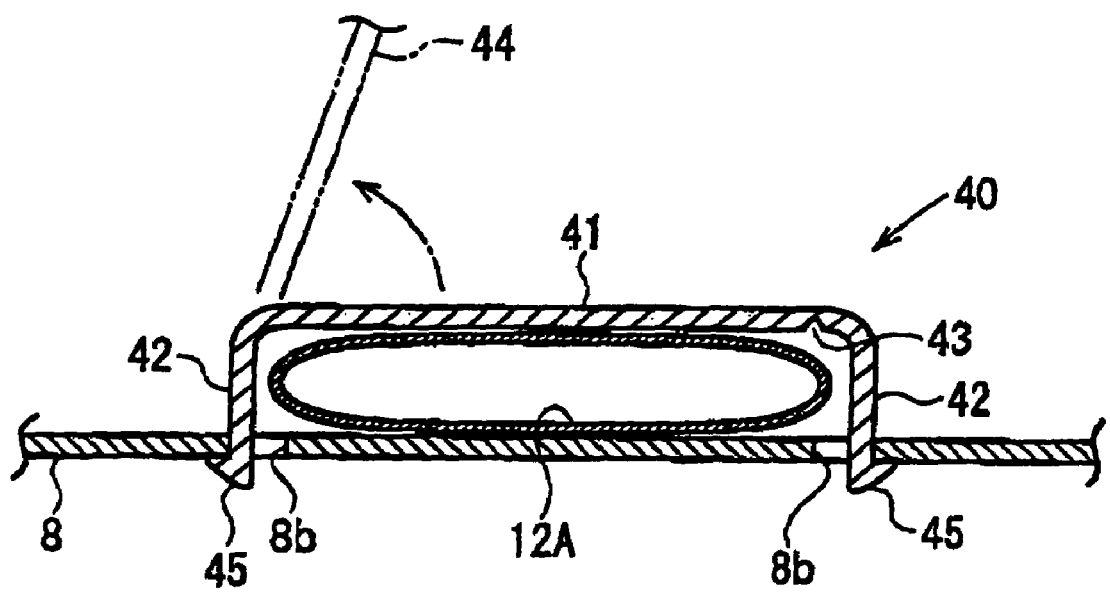
FIG. 8 is a cross-sectional view taken along the line VIII-VIII in FIG. 7.
Figure 9:
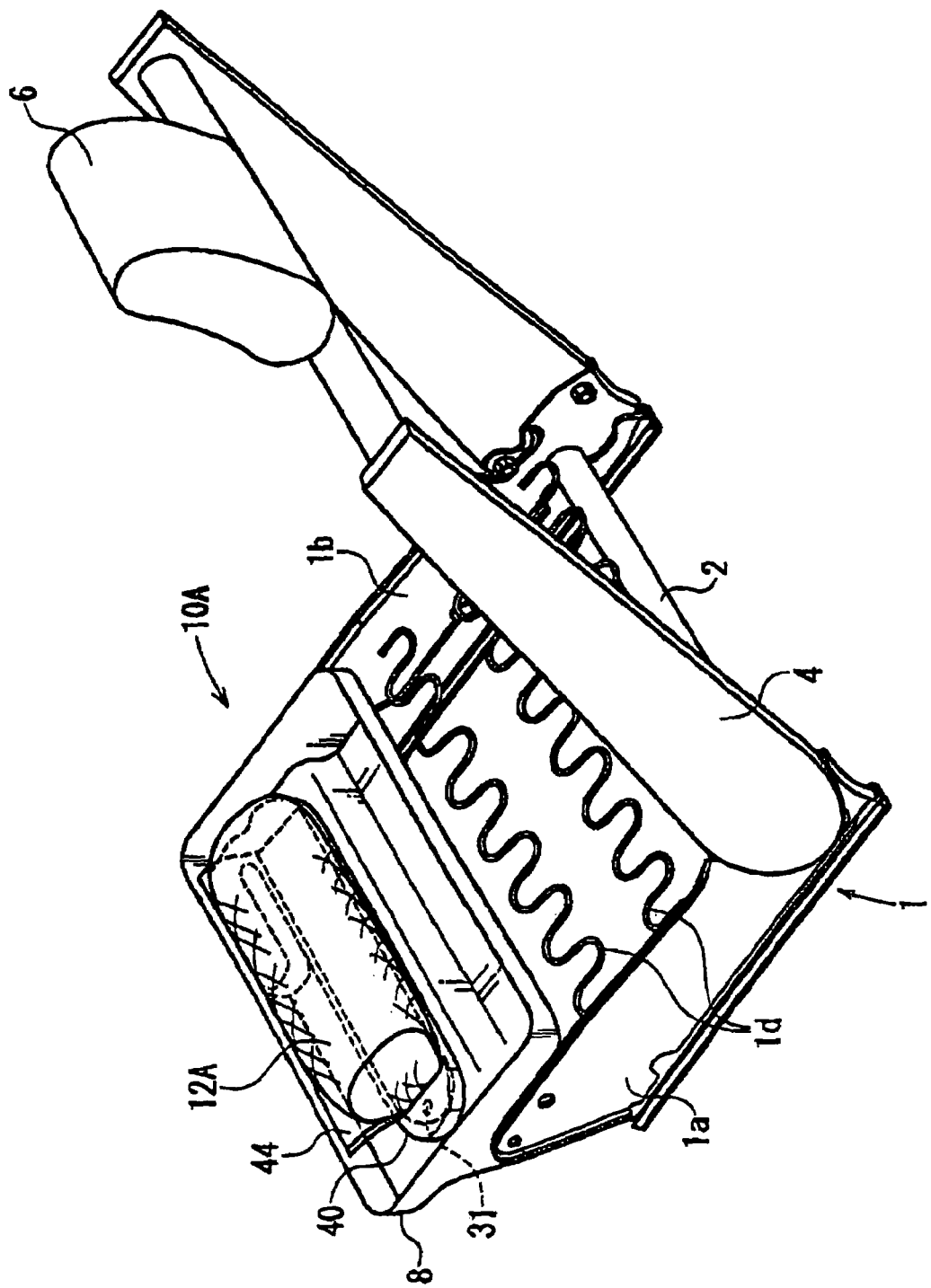
FIG. 9 is a perspective view of the passenger constraining apparatus in FIG. 6 when the bag is inflated.

FIG. 6 and FIG. 7 illustrate perspective views of a seat frame provided with the passenger constraining apparatus according to another embodiment. FIG. 6 shows a state before mounting the protecting member, and FIG. 7 shows a state after mounting the protecting member. FIG. 8 is a cross-sectional view taken along the line VIII-VIII in FIG. 7, and FIG. 9 is a perspective view of the frame of the seat in a state in which the bag of the passenger constraining apparatus is inflated.

A passenger constraining apparatus 10A in this embodiment is configured in such a manner that an inflator 13A is arranged outside a bag 12A, so that gas is introduced into the bag 12A from the inflator 13A via a duct (pipe) 30.

In this embodiment as well, the bag 12A is arranged on the seat pan 8 in a state of being extended in the lateral direction. In this embodiment, lug shaped fixing strips 12a are provided on left and right end sides of the bag 12A, and these fixing strips 12a are secured to the seat pan 8 with hooking members 31 such as bolts respectively so that the bag 12A is fixed.

In this embodiment, a duct receiving port (reference numeral is not provided) is provided at one end side of the bag 12A, and an end of the duct 30 is connected to the duct receiving port.

The inflator 13A is of a substantially rod-shape in this embodiment, and has a configuration in which a gas injection port (not shown) is provided at axial one end side thereof. The other end of the duct 30 is connected to the gas injection port of the inflator 13A. As shown in FIG. 6, in this embodiment, the inflator 13A is installed on the seat pan 8 so as to be adjacent to the bag 12A, and the duct 30 is arranged along the upper surface of the seat pan 8.

As shown in FIG. 7, the bag 12A, the duct 30, and the inflator 13A are covered by a protecting member 40. As shown in FIG. 8, in this embodiment, the protecting member 40 is formed into the shape of a no-bottom container having a main plate portion 41 that covers the bag 12A, the duct 30, and the inflator 13A continuously from above the seat pan 8 (however, only the bag 12A is shown in FIG. 8, hereinafter) and a surrounding wall portion 42 that extends downward from a peripheral edge portion of the main plate portion 41 for surrounding a periphery of the bag 12A, the duct 30, and the inflator 13A continuously for integrally storing the bag 12A, the duct 30 and the inflator 13A.

The main plate portion 41 is adapted to be torn when the airbag 12A is inflated. More specifically, a tear line 43 (FIG. 8) for guiding tearing of the main plate portion 41 is formed along an outer periphery of an area of the main plate portion 41 that opposes the bag 12A according to this embodiment. When the bag 12A is inflated, the main plate portion 41 is torn along the tear line 43 by the inflating pressure of the bag 12A, and the area of the main plate portion 41 that opposes the bag 12A starts to open by being pushed by the inflating bag 12A.

A portion indicated by the double-dashed chain line in FIG. 8 (reference numeral 44) designates an area of the main plate portion 41 that opposes the bag 12A, which is brought into an opened state by being pushed by the inflating bag 12A.

A hooking member 45 for securing the protecting member 40 to the seat pan 8 is provided at a lower portion of the surrounding wall portion 42. In this embodiment, the hooking member 45 is a claw- or hook-shaped resilient member extending downward from a lower end of the surrounding wall portion 42, and the hooking member 45 resiliently engages a hooking member engaging hole 8b provided on the seat pan 8, so that the protecting member 40 is secured to the seat pan 8 as shown in FIG. 8. As shown in FIG. 6, the plurality of hooking members 45 are arranged at different points in the extending direction of the surrounding wall portion 42 as important spots (reference numeral is not shown in FIG. 6).

However, a configuration of the hooking member 45, that is, a method of securing the protecting member 40 to the seat pan 8 is not limited thereto.

In this embodiment, the protecting member 40 is formed of synthetic resin, and the main plate portion 41, the surrounding wall portion 42, and the respective hooking members 45 are integrally formed. However, the material of the protecting member 40 is not limited thereto, and may be formed of various materials such as rubber or metal thin plate.

Other configurations of this embodiment are the same as those in the above-described embodiment, and the same parts are represented by the same reference numerals.

An operation of the passenger constraining apparatus 10A in this configuration is as follows.

When the front collision of the automotive vehicle is detected, the inflator 13A is activated to inject gas, and the gas from the inflator 13A is introduced into the bag 12A via the duct 30. The bag 12A starts inflation by the gas from the inflator 13A and the protecting member 40 is torn by the inflating pressure of the bag 12A. Then, the bag 12A pushes and opens the protecting member 40 to protrude upward. Consequently, the density is increased by the front portion of the seat cushion pushed upward or knocked upward from below, and hence the forward movement of the lumbar part of the passenger is prevented or constrained.

In the passenger constraining apparatus 10A, since the protecting member 40 covers the upper side of the bag 12A when the bag 12A is not inflated, direct contact between the bag 12A and the seat cushion does not exist, and hence good durability and damage-resistant property of the bag 12A are achieved.

In this embodiment, since the inflator 13A and the duct 30 arranged outside the bag 12A are also covered by the protecting member 40, good durability and damage-resistant property is also achieved for these members.

Figure 10:
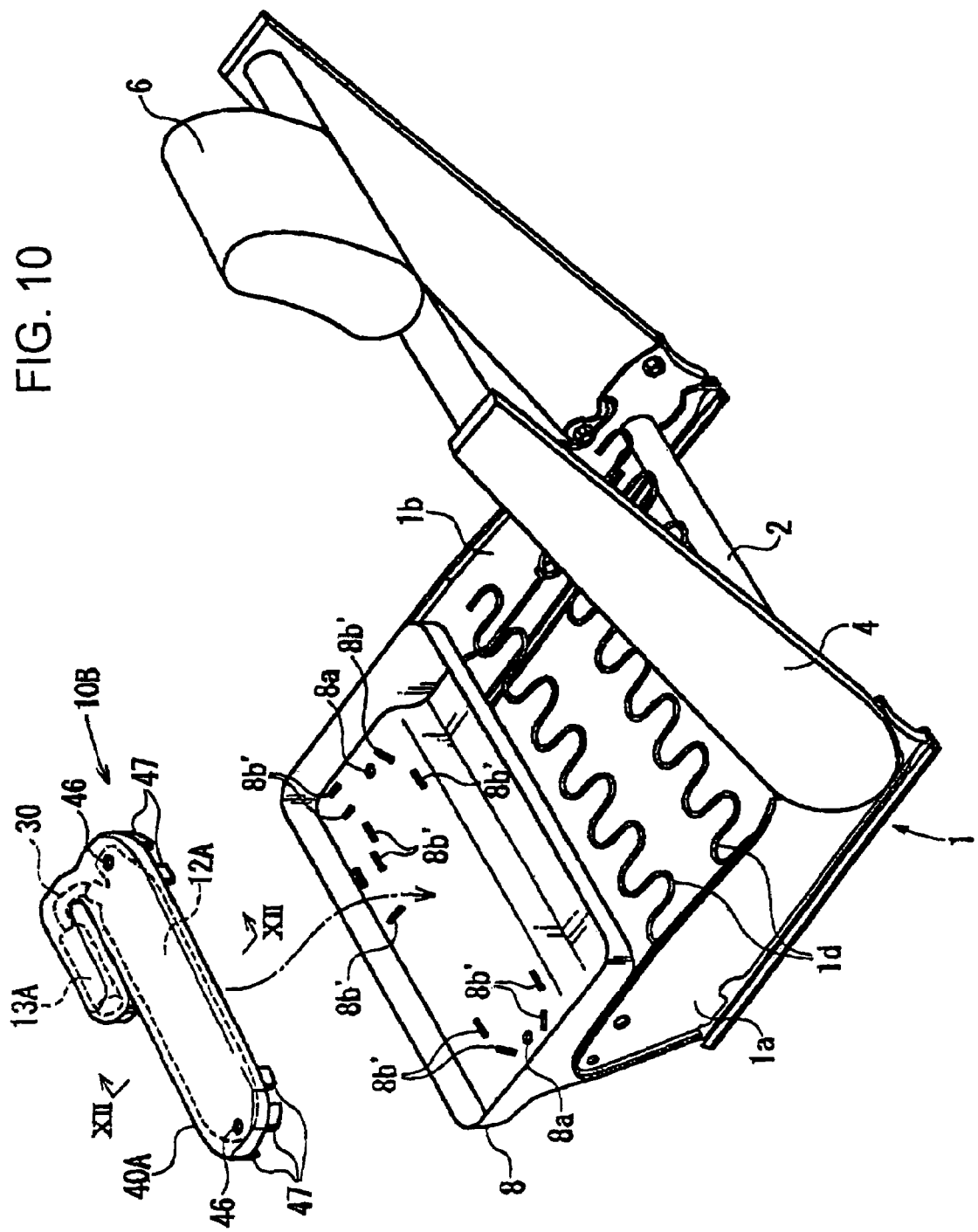
FIG. 10 is a perspective view of a frame of a seat provided with a passenger constraining apparatus according to still another embodiment in a state before the passenger constraining apparatus is mounted.
Figure 11:
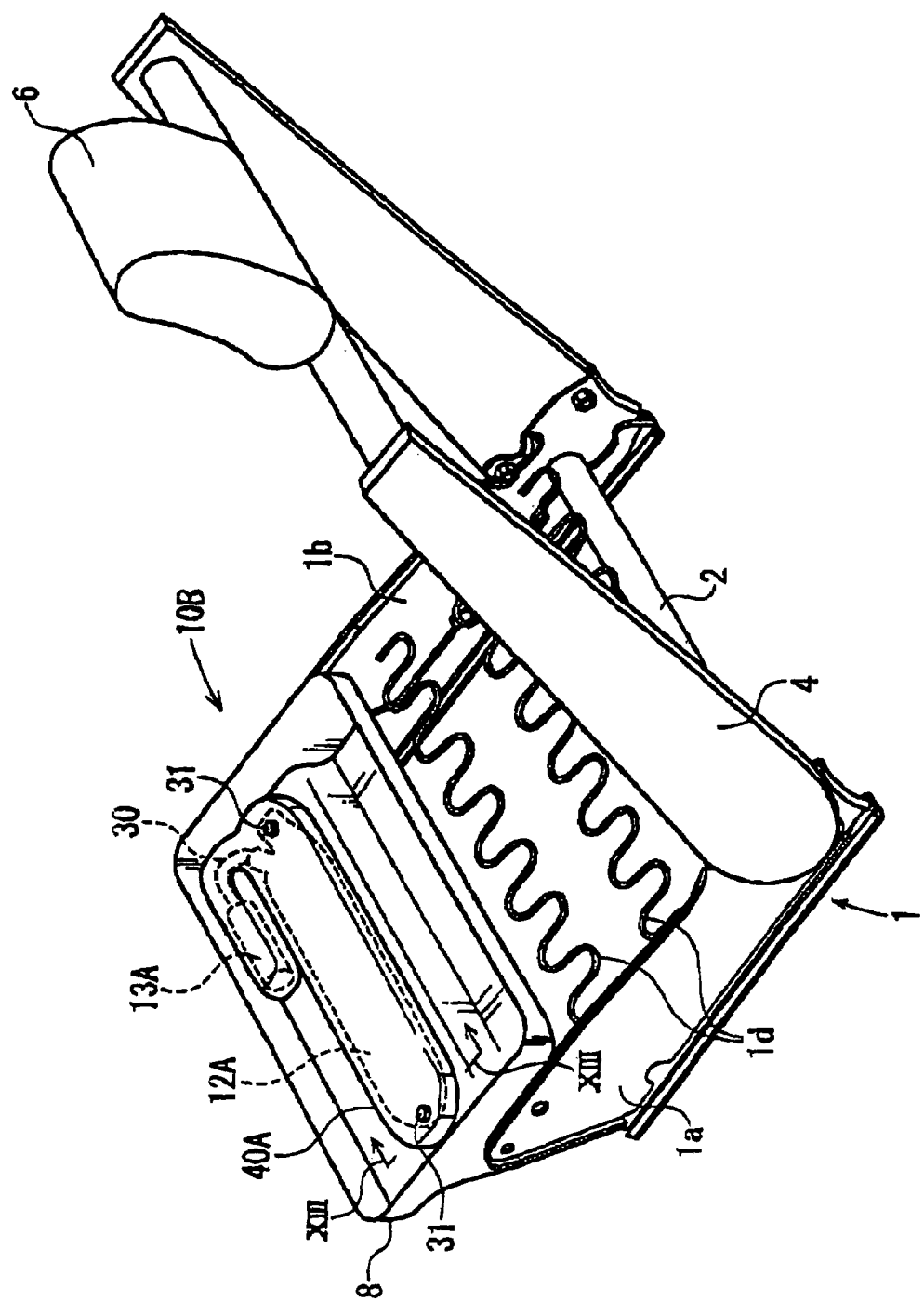
FIG. 11 is a perspective view of the frame of the seat in FIG. 10 in a state after the passenger constraining apparatus is mounted.
Figure 12:
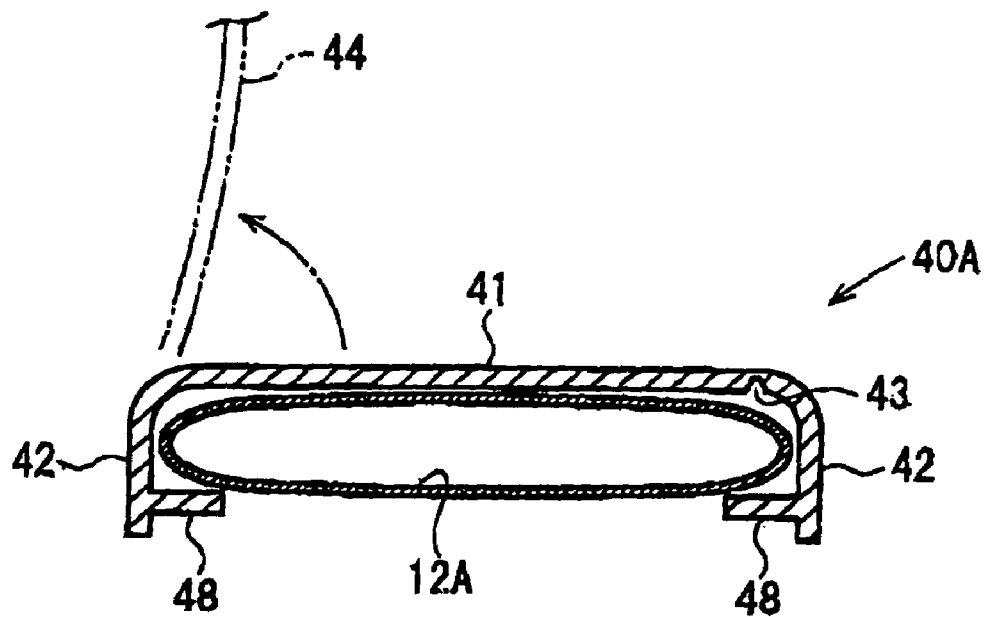
FIG. 12 is a cross-sectional view taken along the line XII-XII in FIG. 10.
Figure 13:
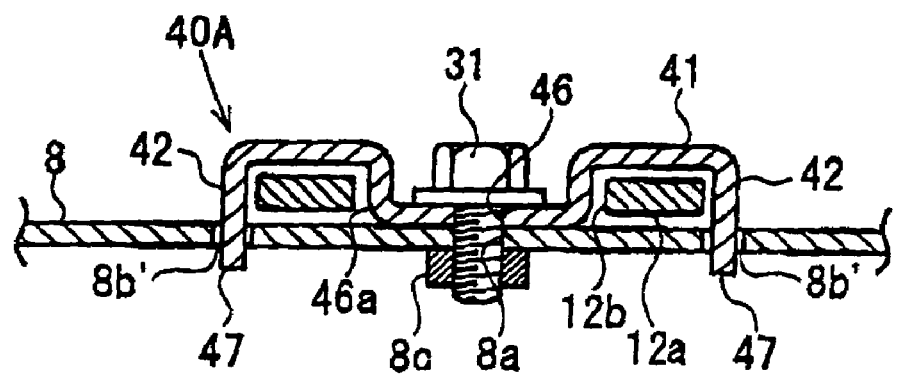
FIG. 13 is a cross-sectional view taken along the line XIII-XIII in FIG. 11.

FIG. 10 and FIG. 11 are perspective view of a frame of a seat provided with the passenger constraining apparatus according to still another embodiment. FIG. 10 shows a state before the passenger constraining apparatus is installed and FIG. 11 is a state after the passenger constraining apparatus is installed. FIG. 12 is a cross-sectional view taken along the line XII-XII in FIG. 9, and FIG. 13 is a cross-sectional view taken along the line XIII-XIII in FIG. 10.

In a passenger constraining apparatus 10B in this embodiment, the bag 12A is secured to the seat pan 8 by the hooking members 31 respectively via the fixing strips 12a at the left and right end sides thereof. Reference numeral 12b in FIG. 13 designates openings provided on the respective fixing strips 12a for inserting the hooking members 31. Reference numerals 8a in FIG. 10 designate openings provided on the seat pan 8 for inserting the hooking members 31. As shown in FIG. 13, in this embodiment, the hooking members 31 are bolts, and nuts 8c to which the bolts are screwed on are secured to the openings 8a.

In this embodiment as well, the inflator 13A is arranged outside the bag 12A, and the inflator 13A and the bag 12A are connected by the duct 30. The bag 12A, the duct 30, and the inflator 13A are integrally covered by a protecting member 40A.

As shown in FIG. 12, the protecting member 40A in this embodiment is formed into the shape of a no-bottom container having the main plate portion 41 that covers the bag 12A, the duct 30, and the inflator 13A continuously from above the seat pan 8 (however, only the bag 12A is shown in FIG. 12, hereinafter) and the surrounding wall portion 42 that extends downward surrounds from the peripheral edge portion of the main plate portion 41 for surrounding the periphery of the bag 12A, the duct 30, and the inflator 13A continuously.

In this embodiment, as shown in FIG. 10, openings 46 for inserting the hooking members 31 are provided at the left and right end sides of an area of the main plate portion 41 that opposes the bag 12A in the overlapping relation with the openings 12b (FIG. 13) of the both fixing strips 12a of the bag 12A.

As shown in FIG. 13, in this embodiment, boss portions 46a to be fitted into the openings 12b of the respective fixing strips 12a are formed by depressing a peripheral edge portion of the respective openings 46 downward. The bag 12A is positioned in the protecting member 40A by engaging the boss portions 46a on both sides of the protecting member 40A with the opening 12b on both sides of the bag 12A, respectively. The height of projection of the boss portion 46a from a back surface of the main plate portion 41 is larger than the vertical thickness of the respective fixing strips 12a.

In this embodiment, a projection 47 for positioning the protecting member 40A with respect to the seat pan 8 is provided so as to project from a lower end of the surrounding wall portion 42, and the seat pan 8 is provided with a projection engaging hole 8b', with which the projection 47 engages, in the overlapping relation with respect to the projection 47 when the protecting member 40A is arranged in a prescribed position (when they are arranged so that the openings 46, 8a of the protecting member 40A and the seat pan 8 match with respect to each other).

As shown in FIG. 12, in this embodiment, overhanging portions 48, which protrude on a lower side of the bag 12A, the duct 30 and the inflator 13A which are arranged in the protecting member 40A, are provided so as to project from a lower end side of the surrounding wall portion 42. With the provision of the overhanging portions 48, the bag 12A, the duct 30 and the inflator 13A are retained in the protecting member 40A.

Other configurations of the passenger constraining apparatus 10B are the same as those of the passenger constraining apparatus 10A in FIGS. 6 to 9 described above, and the same parts in FIGS. 10 to 12 are represented by the same reference numerals as in FIGS. 6 to 9.

A procedure of installing the passenger constraining apparatus 10B in this configuration to the seat pan 8 will be described below.

Firstly, the inflator 13A is connected to the bag 12A via the duct 30 in advance, and these members are assembled into the protecting member 40 together. In this case, the overhanging portions 48 of the protecting member 40A are led to the lower side of the bag 12A, the duct 30 and the inflator 13A to prevent these members from falling out from the protecting member 40A, and then the boss portions 46a on the both sides of the protecting member 40A are engaged with the openings 12b on the fixing strips 12a on the both sides of the bag 12A respectively to position the bag 12A.

Subsequently, the protecting member 40A is arranged on the seat pan 8. In this case, the positioning projection 47 of the protecting member 40A is engaged with the projection engaging hole 8b' of the seat pan 8 for positioning the protecting member 40A. Then, the hooking members (bolts) 31 are inserted into the openings 46, 8a of the protecting member 40A and the seat pan 8 and tightened with the nuts 8c. Accordingly, the protecting member 40A and the bag 12A (and the duct 30 and the inflator 13A) are integrally secured to the seat pan 8.

In this passenger constraining apparatus 10B, since the bag 12A, the duct 30 and the inflator 13A are assembled to the interior of the protecting member 40A in advance into a unit, the installation work to the seat pan 8 is easily.

In this passenger constraining apparatus 10B, since the protecting member 40A and the bag 12A are secured to the seat pan 8 by the common hooking members 31 as described above, the securing work to the seat pan 8 is also simple.

In this embodiment, although the overhanging portions 48 which protrude to the lower side of the bag 12A, the duct 30 and the inflator 13A are provided so as to prevent these members from falling out from the protecting member 40A, these overhanging portions 48 may be omitted.

Figure 14:
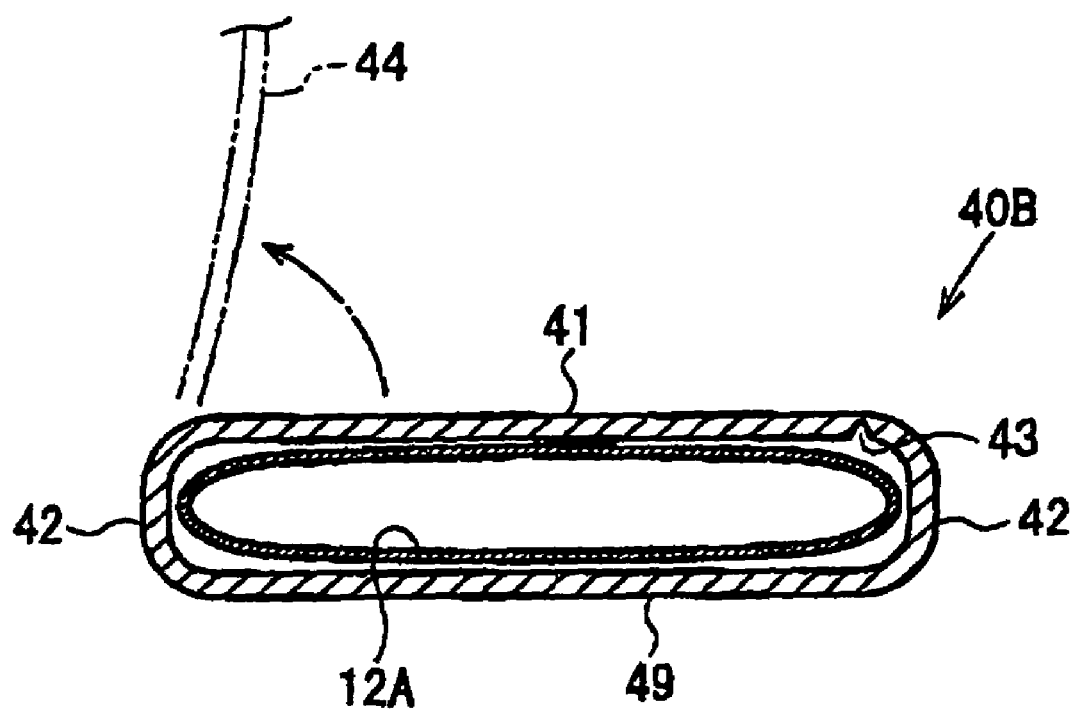
FIG. 14 is a vertical cross-sectional view of a bag portion of the passenger constraining apparatus according to still another embodiment.

The protecting members 40, 40A in the respective embodiments shown above cover only on the upper side of the bag 12A. However, in the present invention, it is also possible to cover both of the upper side and the lower side of the bag by the protecting member. FIG. 14 is a vertical cross-sectional view of the protecting member 40B configured in this manner.

The protecting member 40B includes an upper main plate portion 41 for covering the upper side of the bag 12A, a lower main plate portion 49 for covering the lower side of the bag 12A, and a surrounding wall portion 42 for surrounding the periphery of the bag 12A. In this embodiment, the upper and lower main plate portions 41, 49 and the surrounding wall portion 42 are integrally formed and the upper main plate portion 41 is adapted to be torn along the tear line 43 when the bag 12A is inflated.

Other configurations of the protecting member 40B are the same as the protecting members 40, 40A in the respective embodiments shown in FIG. 6 to FIG. 13 described above, and the reference numerals in FIG. 14 which are the same as those in FIG. 6 to FIG. 13 designate the same parts.

In the protecting member 40B, not only the upper side of the bag 12A is covered by the upper main plate portion 41, but also the lower side thereof is covered by the lower main plate portion 49. Therefore, the bag 12A does not come into contact with both of the seat cushion and the seat pan, and hence good durability and the damage-resistant property of the bag 12A are achieved.

The respective embodiments in FIG. 6 to FIG. 14 described above are configured in such a manner that the protecting member is torn along the tear line when the bag is inflated. However, the method of opening the protecting member is not limited thereto. For example, it is also possible to configure in such a manner that the portion of the protecting member for covering the upper side of the bag and the portion for covering the lower side of the protecting member are provided separately so that these members are connected when the bag is not inflated and the protecting member is opened by separation of these members when the bag is inflated.

Figure 15A:
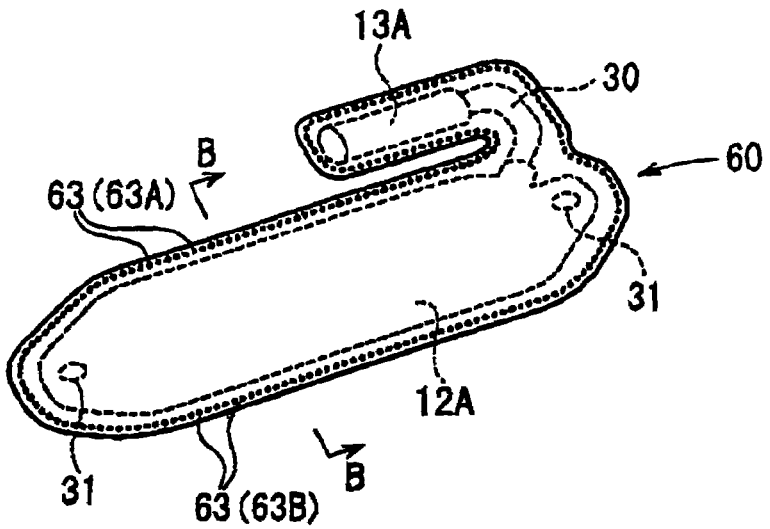
FIGS. 15(a), 15(b), and 15(c) are pattern diagrams of the passenger constraining apparatus according to still another embodiment.
Figure 15B:
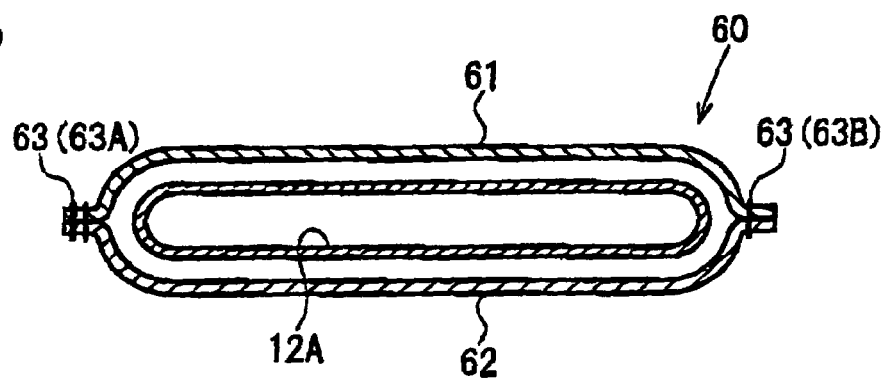
Figure 15C:
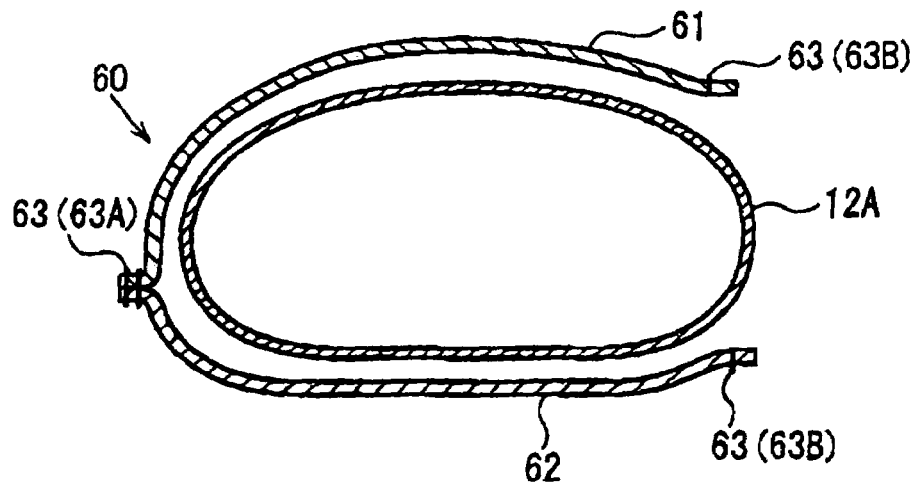

FIG. 15 is an explanatory drawing of a protecting member 60 configured in this manner. FIG. 15(a) is a perspective view showing a state in which the bag 12A (and the inflator 13A, and so on) is covered by the protecting member 60; FIG. 15(b) is a cross-sectional view taken along the line B-B in (a); and FIG. 15(c) is a cross-sectional view showing the similar portion of the same drawing (b) when the bag is inflated.

The protecting member 60 includes an upper covering member 61 for covering the upper side of the bag 12A, the duct 30, and the inflator 13A, and a lower covering member 62 for covering the lower side of the same. In this embodiment, the covering members 61, 62 include sheets or the like formed of cloth material, rubber, or synthetic resin respectively, and are formed into a bag-shaped member that includes the bag 12A, the duct 30 and the inflator 13A by being stitched together by seams 63 (63A, 63B) or threads or the like along the peripheral edges thereof.

In this embodiment, a portion of the seam 63 which is formed by stitching side edges of the covering members 61, 62 along rear edge portions of the bag 12A (the fore-and-aft direction corresponds to the fore-and-aft direction when the bag 12A is installed in the seat) is a tear seam 63B with low strength. The tear seam 63B is configured to be torn by the inflating pressure of the bag 12A and release the connection between the covering members 61, 62 when the bag 12A is inflated. The remaining portion of the seam 63 is a strong seam 63A which is not torn even when the bag 12A is inflated.

Other configurations in this embodiment are the same as those in the respective embodiments shown in FIG. 6 to FIG. 14 described above.

In this embodiment, when the bag 12A is in the non-inflated state, the upper side and the lower side of the bag 12A, the duct 30, and the inflator 13A are covered by the upper covering member 61 and the lower covering member 62 of the protecting member 60, respectively. Therefore, the bag 12A, the duct 30 and the inflator 13A come into contact neither with the seat cushion nor the seat pan, and hence good durability and the damage-resistant property are achieved.

When the bag 12A starts to be inflated, as shown in FIG. 15(c), the tear seam 63B is broken by the inflating pressure of the bag 12A, and connection between the covering members 61, 62 are released. Accordingly, the covering members 61, 62 are separated and inflation of the bag 12A is accommodated.

The respective embodiments described above are illustrative only, and the present invention is not limited to the above-described embodiments.

For example, in the respective embodiments in FIG. 6 to FIG. 15 described above, the protecting member is adapted to be torn when the bag is inflated. However, in the present invention, it is also possible to cover the bag by the protecting member formed of expansible member so that the protecting member is expanded in association with the inflation of the bag when the bag is inflated.

In the respective embodiments shown in FIG. 6 to FIG. 15 described above, it is also possible to provide a protecting member for covering the lower surface of the seat cushion or a protecting member for covering the upper surface of the member under the seat cushion (seat pan or the like) as in the embodiments in FIG. 1 to FIG. 4 in addition to the protecting member for covering the bag (and the inflator and so on).

In the respective embodiments shown in FIG. 6 to FIG. 15 described above, the bag, the inflator arranged outside the bag, and the duct that connects the bag and the inflator are covered integrally by the protecting member. However, these members may be covered by separate protecting members. In the present invention, at least the bag must simply be covered by the protecting member. A configuration in which the inflator is arranged on the back side of the seat pan and only the bag is arranged on the seat pan and covered by the protecting member is also applicable.

As in the respective embodiments shown in FIGS. 1 to 4, the protecting member for covering the bag can be provided also in a mode in which the inflator is arranged in the interior of the bag.

What is claimed is:

1. A passenger constraining apparatus for an automobile, the passenger constraining apparatus comprising:
 a seat pan having a flat, supporting portion;
 a seat cushion of a cushioning material and supported on the seat pan for cushioned support of an occupant seated thereon;
 a lower surface portion of the seat cushion that is supported by the flat, supporting portion of the seat pan so that with an occupant seated on the seat cushion, the seat cushion lower surface portion takes on a generally flat configuration;
 a gas generator;
 an airbag having the gas generator therein and being disposed between the lower surface portion of the seat cushion and the flat supporting portion of the seat pan and having a predetermined footprint in, non-inflated configuration thereof in which the non-inflated airbag is generally flat along an area thereof surrounding the gas generator therein;
 a protective member of a low-friction material, having a flexible, non-rigid construction and being disposed between the airbag and the seat cushion or between the airbag and the seat pan; and
 a large, airbag facing surface of the flexible protective member arranged so that with the protective member attached to the seat cushion or seat pan, an airbag engaging portion of the large, airbag facing surface takes on the generally flat configuration of the generally flat, non-inflated airbag in engagement therewith in the area of the non-inflated airbag surrounding the gas generator with an occupant seated on the seat cushion, and the large, airbag facing surface is sized so that the airbag facing surface completely overlaps the predetermined footprint of the non-inflated airbag and the airbag engaging portion thereof is in engagement with the non-inflated airbag across and along the entire footprint thereof and reduces friction between the seat cushion and non-inflated airbag or between the seat pan and non-inflated airbag, respectively, when downward force is applied to the seat cushion by the occupant seated thereon.

2. The passenger constraining apparatus of claim 1 wherein the protective member is secured to the lower surface portion of the seat cushion.

3. The passenger constraining apparatus of claim 1 wherein the protective member is a sheet formed of one of rubber and resin.

4. The passenger constraining apparatus of claim 1 wherein the seat cushion has a bottom surface including the lower surface portion facing the non-inflated airbag, and the flexible protective member is secured to cover substantially the majority of the bottom surface prior to installation of the seat cushion on the seat pan so installation of the seat cushion on the seat pan simultaneously positions the protective member secured thereto over and against the non-inflated airbag.

5. The passenger constraining apparatus of claim 1 wherein the protective member has a frangible portion configured to cause the protective member to rupture upon airbag deployment with the inflating airbag engaging the seat cushion from therebelow and pushing the seat cushion upwardly.

* * * * *